United States Patent [19]

Ono

[11] 4,332,473
[45] Jun. 1, 1982

[54] APPARATUS FOR DETECTING A MUTUAL POSITIONAL RELATIONSHIP OF TWO SAMPLE MEMBERS

[75] Inventor: Akira Ono, Tokyo, Japan

[73] Assignee: Tokyo Shibaura Denki Kabushiki Kaisha, Kawasaki, Japan

[21] Appl. No.: 114,354

[22] Filed: Jan. 22, 1980

[30] Foreign Application Priority Data

Jan. 31, 1979 [JP] Japan .................................. 54-10080
Mar. 31, 1979 [JP] Japan .................................. 54-38614

[51] Int. Cl.³ .............................................. G01B 9/02
[52] U.S. Cl. ................................ 356/356; 250/237 G; 356/363
[58] Field of Search ............... 356/356, 361, 400, 401; 250/237 G

[56] References Cited

U.S. PATENT DOCUMENTS 4,200,395  4/1980  Smith et al. .......................... 356/356

FOREIGN PATENT DOCUMENTS 2003492  8/1971  Fed. Rep. of Germany .
2819400 11/1978  Fed. Rep. of Germany .
412356  11/1966  Switzerland .

Primary Examiner—John K. Corbin
Assistant Examiner—Matthew W. Koren
Attorney, Agent, or Firm—Cushman, Darby & Cushman

[57] ABSTRACT

An apparatus for detecting a mutual positional relationship of a semiconductor wafer and mask comprises first and second diffraction gratings formed on the wafer and mask and located parallel to each other; a laser source for radiating a coherent light vertically toward the first and second diffraction gratings; a drive mechanism for periodically varying a relative distance between the first and second diffraction gratings; a pair of photosensors for receiving a first interference beam resulting from those +n-order diffracted beams included in said diffracted beams and a second interference beam resulting from those −n-order diffracted beams included in said diffracted beams; and a differential amplifier calculating the difference between the intensities of the first and second interference lights thereby detecting a mutual positional displacement between the first and second diffraction grating.

13 Claims, 7 Drawing Figures

APPARATUS FOR DETECTING A MUTUAL POSITIONAL RELATIONSHIP OF TWO SAMPLE MEMBERS

BACKGROUND OF THE INVENTION

This invention relates to an apparatus for detecting a mutual positional relationship of two members using a pair of diffraction gratings.

A technique for highly accurately aligning two objects, for example a semiconductor wafer and mask, with each other using a pair of diffraction gratings is disclosed in "A new interferometric alignment technique" Applied Physics Letter, vol. 31, No. 7 (1977) p. 426 and "Alignment of X-ray lithography masks using a new interferometric technique-Experimental results" J. Vac. Sci. Technol. 15(3) May/June (1978) p. 984, both being written by S. Austin, D. C. Flanders, H. I. Smith et al. In the first reference entitled to "A new interferometric alignment" first and second diffraction gratings 1 and 2 having the same pitch are arranged in parallel with each other as schematically shown in FIG. 1 herein and a coherent light is vertically directed by a light source 3 at the side of the second diffraction grating 2 toward the diffraction gratings. Those +n- and −n-order beams diffracted on the diffraction gratings are received by light receiving devices 4, 5 and the intensities of the received beams are both displayed on an indicator 6. If there is a displacement $\Delta x$ between the pitches of the diffraction gratings the light beams diffracted on the diffraction gratings 1, 2 are dephased with respect to each other with the result that the +n- and −n-diffracted beams suffer mutually different diffraction modes. For this reason, the light beams incident onto both the light receiving devices 4, 5 are different in their amount and are so displayed on the indicator 6. If in this case the first and second diffraction gratings 1 and 2 are moved in the horizontal direction relative to each other until the amounts of light beams incident onto the light receiving devices 4 and 5, respectively, are made to coincide with each other, the above-mentioned displacement $\Delta x$ ceases to exist, thus completing a positional alignment.

In the second reference entitled "Alignment of X-ray lithography masks using a new interferometric technique-Experimental results", a coherent light is directed by a light source at the side of a first diffraction grating 1 toward the first and second diffraction gratings 1 and 2 as schematically shown in FIG. 2 herein. The light beams diffracted on the diffraction gratings are received by detectors 4, 5 and a positional alignment is effected as in the case of the first reference.

The above-mentioned positional alignment techniques have an advantage of being capable of effecting a positional alignment with a high accuracy determined by the pitch of the diffraction gratings 1, 2 and wavelength $\lambda$ of the coherent light. When, however, the positional alignment is to be effected using these techniques, if a distance D between the diffraction gratings varies during the horizontal movement of the gratings relative to each other, the optical length varies. As a result, the phase of the diffracted beams greatly varies, thus making it very difficult to judge a positional displacement. If such technique is actually applied to various apparatus it would be almost impossible to prevent a variation in the distance D between the gratings from occurring due to, for example, floor vibrations and vibrations of movable operating members. Furthermore, even if other beams (disturbed beams) than the diffracted beams are incident onto the devices 4, 5 it would be impossible to make accurate detection and, therefore, greatest care has to be exercised against such disturbed beams.

SUMMARY OF THE INVENTION

It is accordingly an object of this invention to provide a practical apparatus for detecting a mutual positional relationship of two members, which can highly accurately effect a positional alignment without suffering any adverse influence resulting from a variation in position between a pair of diffraction gratings and disturbed beams.

BRIEF DESCRIPTION OF THE DRAWINGS

This invention will be explained below by way of example by referring to the accompanying drawings, in which.

DETAILED DESCRIPTION OF THE PREFERRED EMBODIMENTS

Light beams diffracted on a pair of diffraction gratings will be analytically explained below in an attempt to obtain an easy understanding of an apparatus of this invention. Though explained in connection with a reflected beam, a diffracted beam is also applied to a transmitted beam.

Figure 1:
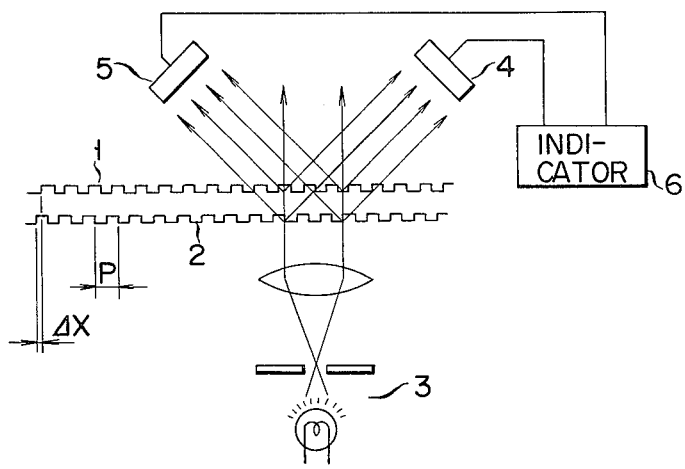
FIGS. 1 and 2 are diagrammatic views for explaining a principle on which conventional position alignment apparatus of different types are operated.
Figure 2:
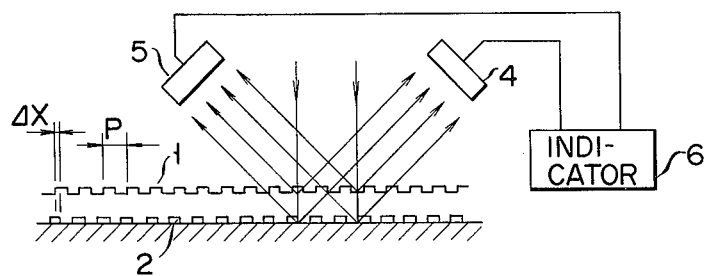
Figure 3:
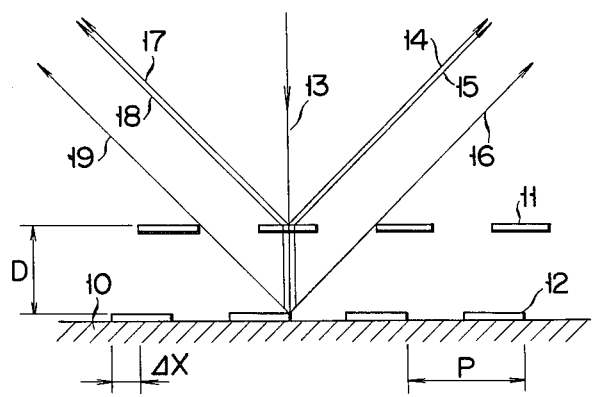
FIG. 3 is a diagrammatic view for explaining the operational principle of an apparatus of this invention.

In FIG. 3 a second diffraction grating or phase grating 12 is disposed on an object on which light beams are reflected. A first diffraction grating or phase grating 11 is located above the second diffraction grating such that it is parallel with the second diffraction grating with a predetermined distance D left therebetween. The first and second gratings 11 and 12 are formed to have the same pitch P. A coherent light such as a laser light is vertically directed toward the diffraction gratings 11, 12. Main +n- and −n-order beams diffracted on the diffraction gratings 11, 12 are, for example, as follows:

(1) a first diffracted beam 14 reflected and diffracted on the first diffraction grating 11.

(2) a second diffracted beam 15 reflected on the second diffraction grating 12, after passing through the first diffraction grating 11, and transmitting and diffracted on the first diffracted grating 11.

(3) a third diffracted beam 16 reflected and diffracted on the second diffraction grating 12, after passing the first diffraction grating 11. (It is to be noted that an n-mode is taken by way of example.)

With the amplitudes of the respective diffracted beams 14, 15 and 16 indicated by a, b and c, respectively, the complex amplitude of the first diffracted beam, $Ea^{+n}$, can be expressed as follows:

$$Ea^{+n} = a \tag{1}$$

The complex amplitude of the second diffracted beam 15, $Eb^{+n}$, is given by:

$$Eb^{+n} = b \cdot \exp i\left(2\pi \frac{2d}{\lambda}\right) \tag{2}$$

where
i: an imaginary number
$\lambda$: the wavelength of the laser beam 13
d(=D): an optical length between the upper surface of the first diffraction grating 11 and the upper surface of the second diffraction grating 12

The complex amplitude of the third diffracted beam, $Ec^{+n}$, is given by $$Ec^{+n} = c \cdot \exp i(M + N) \tag{3}$$

$$M = 2\pi \frac{\left(1 + \cos\frac{\lambda}{P}\right)d}{\lambda}, \quad N = 2\pi \frac{n \cdot \Delta x}{P}$$

where
P: the pitch length of the diffracted gratings 11 and 12
$\Delta x$: a displacement between the diffraction gratings 11 and 12

In consequence, the +n-order beams constitute a composite beam (interference beam) comprised of the above-mentioned three diffracted beams 15, 16 and 17. The intensity $I^{+n}$ of the composite beam will be given below by making $\lambda/P \simeq 0$ and $\cos(\lambda/P) \simeq 1$.

$$\begin{aligned} I^{+n} &= |Ea^{+n} + Eb^{+n} + Ec^{+n}|^2 \\ &= a^2 + b^2 + c^2 + 2ab \cos\frac{4\pi d}{\lambda} \\ &+ 2ac \cos\left(\frac{4\pi d}{\lambda} + \frac{2\pi n \cdot \Delta x}{P}\right) \\ &+ 2bc \cos\left(\frac{2\pi n \cdot \Delta x}{P}\right) \end{aligned} \tag{4}$$

Likewise, the complex amplitudes $Ea^{-n}$, $Eb^{-n}$ and $Ec^{-n}$ of the $-n$-order diffraction beams 17, 18 and 19 are expressed as follows:

$$Ea^{-n} = a \tag{5}$$

$$Eb^{-n} = b \cdot \exp i\left(2\pi \frac{2d}{\lambda}\right) \tag{6}$$

$$Ec^{-n} = c \cdot \exp i(M - N) \tag{7}$$

These diffracted beams 17, 18 and 19 interfere with each other and the intensity of the $-n$-order beam will be given below:

$$I^{-n} = a^2 + b^2 + c^2 + 2ab \cos\frac{4\pi d}{\lambda} \tag{8}$$

-continued
$$+ 2ac \cos\left(\frac{4\pi d}{\lambda} - \frac{2\pi n \cdot \Delta x}{P}\right)$$

$$+ 2bc \cos\left(\frac{2\pi n \cdot \Delta x}{P}\right)$$

In the above-mentioned first and second references it is assumed that when upon comparison the intensity of the composite beam, $I^{+n}$, coincides with that of the $-n$-order beam a positional displacement $\Delta x$ between the diffraction gratings 11, 12 ceases to exist. By so doing, the positional alignment is effected. It is noted from Equations (4) and (8), however, that the intensities $I^{+n}$, $I^{-n}$ of the beams are a function of the displacement $\Delta x$ and also a function of the distance (optical length) d between the upper surfaces of the diffraction gratings 11 and 12. Since the above-mentioned distance D may vary when the positional alignment is effected it has been conventionally impossible to accurately judge the result of comparison.

According to this invention the above-mentioned problem can be solved by finding out a difference between the intensities $I^{+n}$ and $I^{-n}$ of beams and at the same time properly adjusting the phases of the diffracted beams 14 through 19. A difference between the intensities $I^{+n}$ and $I^{-n}$ of the beams, if found, will be:

$$\begin{aligned} I^{-n} - I^{+n} &= 2ac\left\{\cos\left(\frac{4\pi d}{\lambda} - \frac{2\pi n \cdot \Delta x}{P}\right)\right. \\ &\left. + \cos\left(\frac{4\pi d}{\lambda} + \frac{2\pi n \cdot \Delta x}{P}\right)\right\} \\ &= 4ac \sin\left(\frac{2\pi n \cdot \Delta x}{P}\right) \sin\left(\frac{4\pi d}{\lambda}\right) \end{aligned} \tag{9}$$

As will be evident from Equation (9), when the displacement $\Delta x$ between the diffraction gratings 11 and 12 has a predetermined relation $$\sin\left(\frac{2\pi n \cdot \Delta x}{P}\right) = 0 \tag{10}$$

,that is, $$\frac{2n \cdot \Delta x}{P} = m \text{ (integer)} \tag{11}$$

With respect to the pitch length P of the diffraction grating, the above-mentioned difference is constant (i.e. a zero) irrespective of the variation of the distance d. Even if the wavelength $\lambda$ of the laser beam 13 varies the above-mentioned difference is also constant (a zero). With this in mind means (first means) is provided for oscillating the diffraction grating 11 or 12 in a direction of illumination of the laser beam 13 and always oscillatingly varying the distance between the diffraction gratings 11, 12 to permit the phase of the diffracted beam to be modulated. By obtaining an average value (smoothed value) of the intensities of the interference beams included in the phase-modulated, diffracted beams the variation of the distance d is cancelled and a singular point of the function is found out which is dependent only upon the displacement between the above-mentioned diffracted gratings 11 and 12. Another means (second means) is also provided for modulating the wavelength λ of the laser beam 13 to cause the phase of the diffracted beams to be modulated and finding out an intensity difference of the beams which is dependent only upon the displacement between the diffracted gratings 11, 12. Supposing that the diffracted grating 11 is oscillated, a distance d(t) at an instant time t between the gratings 11 and 12 will be:

$$d(t) = d_0 + \Delta d \sin 2\pi ft \qquad (12)$$

where
  Δd: the oscillation amplitude
  f: the oscillation frequency
  $d_0$: the center-to-center distance (neutral distance)
In consequence, Equation (9) may be rewritten as follows:

$$I^{-n} - I^{+n} = 4ac \sin\left(\frac{2\pi n \cdot \Delta x}{P}\right) \qquad (13)$$

$$\times \sin\left\{\frac{4\pi}{\lambda}(d_0 + \Delta d \sin 2\pi ft)\right\}$$

That is, the intensity difference may be taken as corresponding to a signal which is always oscillating at an amplitude of:

$$\sin\left\{\frac{4\pi}{\lambda}(d_0 + \Delta d \sin 2\pi ft)\right\}$$

By smoothing out such signal it is possible to observe the displacement Δx.

The apparatus according to one embodiment of this invention as manufactured based on the above-mentioned principle will be explained below by referring to FIG. 4.

Figure 4:
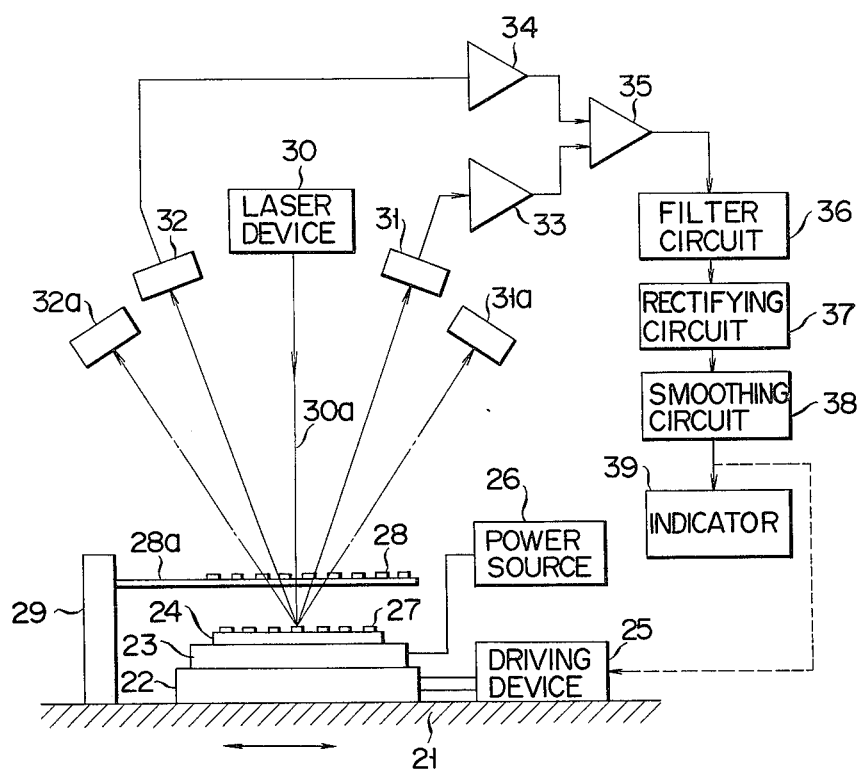
FIG. 4 is a diagrammatic view showing an apparatus according to one embodiment of this invention.

In FIG. 4, reference numeral 21 shows a fixed base having a flat upper surface and a movable table 22 is disposed on the upper surface of the fixed base 21 such that it can be moved in the horizontal direction along the upper surface of the base 21. A first sample such as a semiconductor wafer 24 is disposed on the surface of a piezoelectric oscillating element 23 overlying the movable table 22. A table moving device such as a piezoelectric driving device 25 is disposed on the base 21 to permit the movable table 21 to be highly accurately moved in a direction as indicated by arrows in FIG. 4. A power source 26 is connected to the piezoelectric oscillating element 23 and the piezoelectric oscillating element 23 is oscillated by a signal (from the power source) in the vertical direction at a predetermined cycle to permit the first sample 24 to be oscillated in the vertical direction i.e. in the direction of the thickness of the sample 24. A first diffraction grating 27 is disposed on the horizontal surface of the sample 24 and a second diffraction grating 28 is formed on a second sample 28a such as an IC-mask disposed above the first diffraction grating 27, with a predetermined spacing d therebetween. The second sample 28a is fixedly mounted in place on a support 29 which is fixed to the base 21. These diffraction gratings 27, 28 are designed to have the same pitch length P and adapted to have their grating elements arranged along the vertical direction of movement of the movable table 22. A coherent light beam source such as an He-Ne gas laser device 30 is located above the second diffraction grating 28 and a laser beam 30a of a predetermined wavelength from the device 30 is vertically directed toward the second diffraction grating 28. First and second photosensors 31, 32 such as photo-diodes are arranged at equal angles with respect to the optical axis of the laser beam 30a from the device 30 and in a direction of movement of the table 22. These photosensors 31, 32 receive those +n- and −n-order beams which are diffracted on the first and second diffraction gratings 27 and 28, and generate electrical signals each corresponding to an amount of light beams incident thereto. The photosensors 31 and 32 are connected to pre-amplifiers 33 and 34, respectively, the outputs of which are connected to an input of a differential amplifier 35. The electrical signals of the photosensors 31 and 32 are amplified by the pre-amplifiers 33 and 34 and sent to the differential amplifier 35 where a difference of these signals is calculated. The output of the differential amplifier 35 is connected to an indicator 39 through a filter circuit 36, rectifying circuit 37 and smoothing circuit 38. The filter circuit passes only two signals which have oscillation frequency (f) and its double frequency (2f). That is, the difference output signal of the differential amplifier 35 has its unwanted frequency components eliminated by the filter circuit 36, the output of the filter circuit 36 is rectified by the rectifying circuit 37, and the output of the rectifying circuit 37 is smoothed for display on the indicator 39. The output of the smoothing circuit 38 is also connected to the table moving device 25. By the output signal of the smoothing circuit 38 the drive force of the table moving device 25 is controlled and under this control the movable table 22 is moved.

According to the apparatus of this invention interference beams resulting from those +n- and −n-order beams diffracted on the diffraction gratings 27 and 28 are respectively received by the photosensors 31, 32 as a light signal of an intensity corresponding to the displacement between the diffraction gratings 27 and 28 and a difference of these beams is found out by the difference amplifier 35. At this time, those disturbed beams incident onto the photosensors 31, 32 are cancelled out by the differential operation of the differential amplifier 35 and thus eliminated. By so doing, it is possible to eliminate an adverse influence resulting from the disturbing beams. With the oscillation frequency of the oscillator 23 indicated by f the filter circuit 36 has such a characteristic as to permit those signals of frequencies f and 2f to pass therethrough. By the filter circuit 36 those oscillation components produced during the movement of the table 22 and/or resulting from the disturbing beams are eliminated, thereby preventing an adverse effect resulting from a floor oscillation etc. The output signal of the filter circuit is rectified and then smoothed, thus obtaining a DC level signal corresponding to an amplitude of $$\sin\left\{\frac{4\pi}{\lambda}(d_0 + \Delta d \sin 2\pi ft)\right\}$$

as shown in Equation (13). The DC signal value is indicated on the indicator 39, showing a positional relation between the diffraction gratings 27 and 28. According to the DC level signal value the table moving device 25 causes the table 22 to be controllably moved in a direction indicated by arrows in FIG. 4. The movement of the table 22 is stopped by finding that the DC level signal becomes a zero. When the zero is obtained the movement of the table 22 is stopped to permit a positional alignment to be effected. That is, the positional alignment is effected between the second diffraction grating 28 and the first diffraction grating 27 and thus between both samples 24, 28a.

Figure 5:
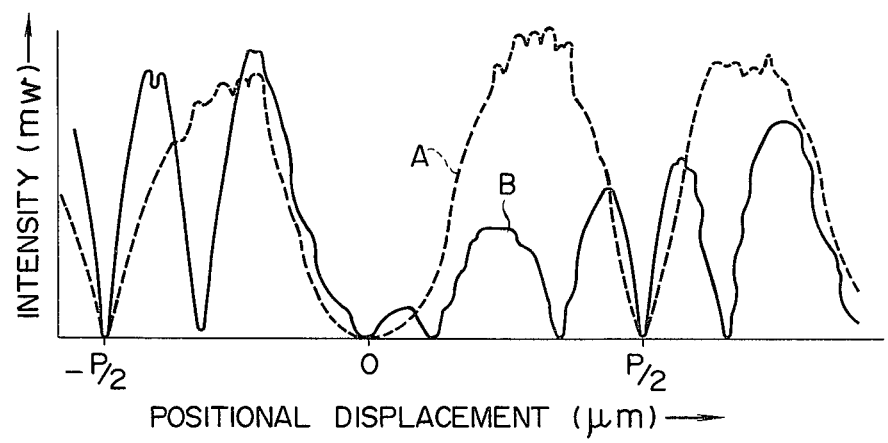
FIG. 5 is a graph showing a relation of a variation in the intensity of a detected signal to a positional displacement of diffraction gratings of the apparatus shown in FIG. 4.

FIG. 5 is a graph showing a relation of a variation in the output level of the smoothing circuit 38 to a positional displacement, where a pair of photosensors are provided to receive those interference beams resulting from the ±first-order diffracted beams (1) and those interference beams resulting from the ±third-order diffracted beams (2). In the graph, the abscissa shows a positional displacement (micrometer) between the diffraction gratings and the ordinate shows the output level (volt) of the smoothing circuit, the characteristic curve A as indicated by broken lines corresponding to the curve of the ±first-order diffracted beams and the characteristic curve B as indicated by solid lines corresponding to the curve of the ±third-order diffracted beams.

As evident from Equation (5) and above-mentioned theoretical expressions a zero output is obtained when there is no displacement between the diffraction gratings or when there is a displacement (P/2) corresponding to one half of the pitch length of the diffraction grating. In the latter case, a zero is obtained while showing a sharp variation of the intensity. From FIG. 5 it will be appreciated that the higher the order of the diffracted beams the more clear the variation of the characteristic. If, as indicated by reference numerals 31a, 32a in FIG. 4, additional photosensors are arranged to receive interference beams resulting from the ±k-order diffracted beams different from the ±n-order diffracted beams and the photosensors 31a, 32a and 31, 32 are selectively used, a highly accurate positional alignment can be easily effected. In order to enhance the accuracy with which the positional alignment is effected, further photosensors in pair or pairs are arranged to detect an additional order of the diffracted beams. That is, in order to attain this object the photosensors 31a, 32a and 31, 32 and said further photosensors may be properly selectively switched. In other words, where said further photosensors are arranged in pair or pairs, it is possible to first make coarse adjustment by, for example, the ±first-order diffracted beams and then fine adjustment by a lower order of the diffracted beams. In order for the second diffraction grating to be oscillated in a direction of incidence of the coherent beams, not only can an oscillating element such as the piezoelectric oscillating element be used, but also a sound pressure from, for example, a speaker can be used. Although in the above-mentioned embodiment the photosensors are arranged to detect the reflected, diffracted beams, they may be arranged to receive those transmitted, diffracted beams.

With the above-mentioned embodiment, unless the laser beam emitted from the laser device is vertically directed onto the diffraction grating the accuracy with which positional alignment is effected between a pair of objects is lowered as the distance d between the first and second diffraction gratings becomes wider. It is therefore necessary that the angle of incidence of the laser beam be made accurately at 90° with respect to the diffraction grating. If, for example, the laser beam falls onto the diffraction grating such that it is displaced $\Delta\theta$ away from 90° with respect to the diffraction grating, a position misalignment $\epsilon$ between the pair of objects will be:

$$\epsilon = d \sin \Delta\theta$$

With the laser device currently in use the direction of emission of the laser beam is varied on the order of $10^{-4}$ radians with time. To enhance the accuracy of the positional alignment the distance d between the diffraction gratings has to be made smaller, presenting a problem of narrowing the application range.

When in particular accurate aligning is effected as in the alignment between a semiconductor wafer and an IC mask, a distance d between the gratings has to be always measured to maintain the distance d within a prescribed value. The distance d can be calculated from the amplitude value of oscillation of a first sample when an amplitude energy of a predetermined value is inputted to the piezoelectric oscillating element 23 or the speaker. It is because, as the distance d becomes smaller, air between the gratings serves as a damper, making it difficult for the first sample to oscillate and thus making the oscillation amplitude smaller. The amplitude oscillation measuring method includes a method using a noncontacting type displacement meter, eddy current displacement meter etc., as well as a light interference method. The light interference method in particular is effective, since the optical system of FIG. 4 can be directly used.

Figure 6:
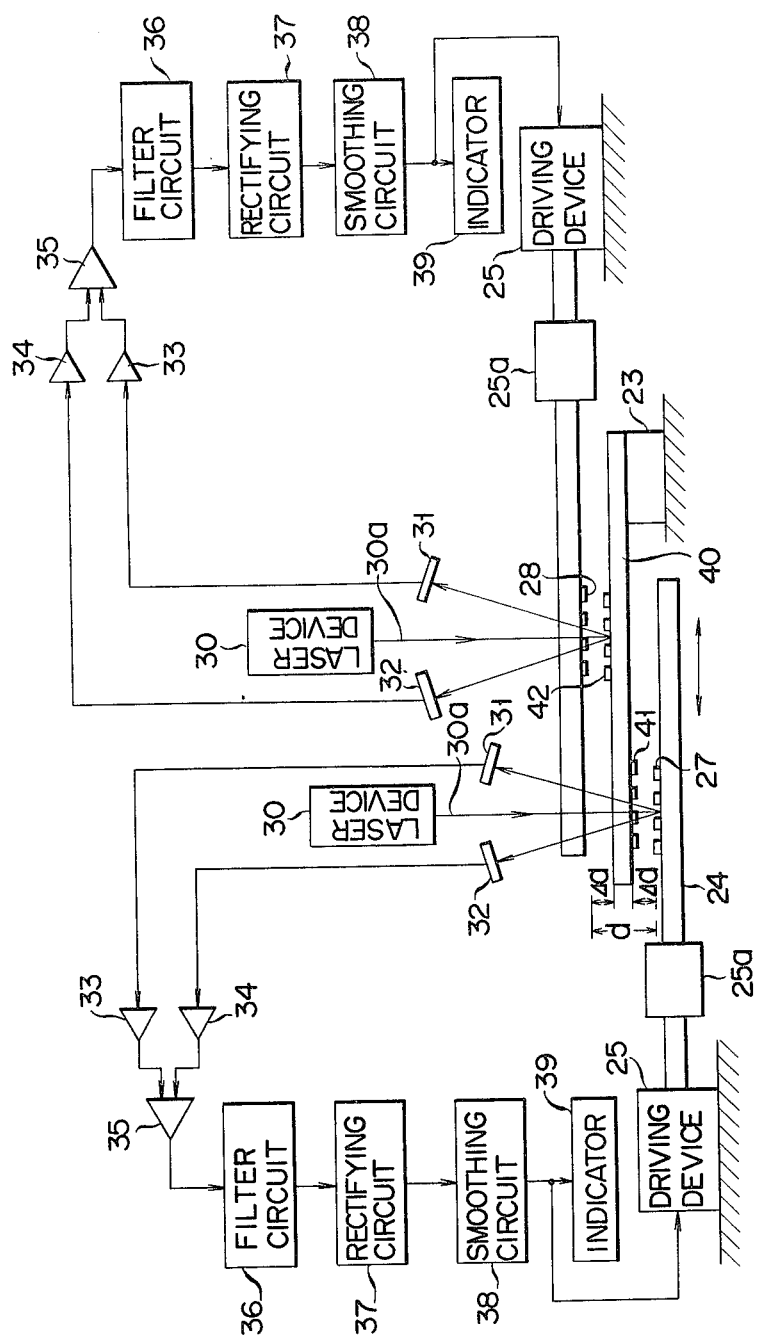
FIG. 6 is a diagrammatic view showing an apparatus according to another embodiment of this invention.

According to an apparatus as shown in FIG. 6 the above-mentioned problem in the case of a large distance d is solved. Like reference numerals are employed in this embodiment to designate like parts or elements corresponding to those shown in FIG. 4 and further explanation is omitted. In the embodiment as shown in FIG. 6, first and second diffraction gratings 27, 28 are disposed with a predetermined distance d left therebetween and adapted to be moved in the arrow-indicated direction by the corresponding moving devices 25 through the corresponding chucks 25a. A jig 40 having mutually parallel, upper and lower smooth surfaces is disposed between the diffraction gratings 27 and 28. A third diffraction grating 41 is disposed on the lower surface of the jig 40 to face the diffraction grating 27 and a fourth diffraction grating 42 is disposed on the upper surface of the jig 40 to face the second diffraction grating 28. The first and third diffraction gratings 27 and 41 have the same pitch and the second and third diffraction gratings 28 and 42 have the same pitch. The first and third diffraction gratings 27 and 41 are disposed at a small distance $\Delta d$ apart from each other and the second and fourth diffraction gratings 28 and 42 are disposed at a small distance $\Delta d$ apart from each other. The jig 40 is supported by a piezoelectric oscillating element 23 to permit it to be oscillated vertically (in the up and down directions) by the piezoelectric oscillating element 23 at a predetermined frequency. A laser light 30a from one laser device is vertically directed down onto the first and third diffraction gratings 27 and 41, and those interference beams resulting from ±n-order beams reflected and diffracted on the diffraction gratings 27 and 41 are converted by a pair of photosensors 31, 32 to an electric signal corresponding to their intensity. A laser beam 30a from another laser device is vertically directed down onto the second and fourth diffraction gratings 28 and 42 and those interference beams included in ±n-order beams diffracted on the diffraction gratings 28 and 42 are converted by a pair of photosensors 31, 32 to an electric signal. As in the embodiment as explained in connection with FIG. 4, the electric signal is processed through the corresponding differential amplifier 35, filter circuit 36, rectifying circuit 37 and smoothing circuit 38 and displayed on the indicator. By the same electric signal a table moving device 25 is controllably driven.

Figure 7:
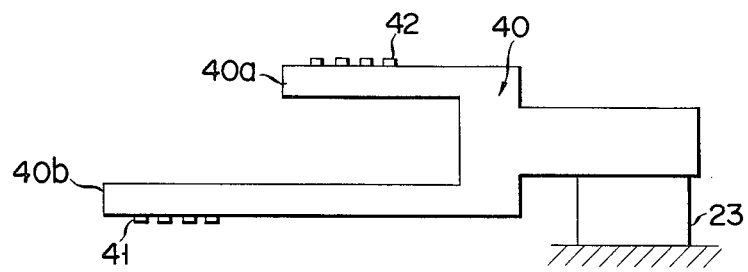
FIG. 7 shows a modified form of jig as used in the apparatus of FIG. 6.

If with the embodiment shown in FIG. 6 positional alignment is made between the first and third diffraction gratings in one hand and between the second and fourth diffraction gratings in the other hand, positional alignment can be effected between the first and second diffraction gratings and thus between the objects (in pair) on these diffraction gratings. If during the positional alignment the distance Δd between the diffraction gratings is made smaller using a thicker jig no prominent lowering of the positional accuracy is produced even if the incident angle of the laser beam is somewhat displaced away from 90° with respect to the diffraction grating. That is, an error $\epsilon_1 = \Delta d \sin \Delta \theta$ resulting from a variation in the incident angle of the laser beam can be made smaller by decreasing the distance Δd. A jig 40 disposed between the first and second diffraction gratings 27 and 28 may have upper and lower, parallel legs 40a, 40b extending parallel to each other as shown in FIG. 7, the lower leg 40b having a third diffraction grating 42 on the forward portion of the lower surface thereof and the upper leg 40a having a fourth diffraction grating 42 on the forward portion of the upper surface thereof. The use of such a jig permits the distance Δd between the diffraction gratings to be decreased.

Although in the above-mentioned embodiment the two laser devices are used, one laser device may be used instead. In this case, a laser beam from said one laser device is divided by a light dividing member such as a half mirror into two beams so that they can be incident onto the corresponding diffraction gratings. While in the above-mentioned embodiment the distance between the diffraction gratings is periodically varied, the wavelength λ of the incident coherent light may be periodically varied i.e. the phase of the beams diffracted on the second diffraction grating may be modulated with respect to that of the beams diffracted on the first diffraction grating.

What is claimed is:

1. An apparatus for detecting a mutual positional relationship of two sample members, comprising:
    first and second diffraction gratings, one attached to each of said two sample members, respectively, said first and second gratings being parallel to and facing each other, said first and second diffraction gratings having the same pitch and being separated by an average distance d;
    a light source for radiating a coherent light vertically toward the first and second diffraction gratings, said light having a frequency λ;
    modulating means for modulating one of d and λ; and
    detecting means for receiving a first interference beam resulting from those +n-order diffracted beams included in said diffracted beams and a second interference beam resulting from those −n-order diffracted beams included in said diffracted beams and calculating the difference between the intensities of the first and second interference beams thereby detecting a mutual positional displacement between the first and second diffraction grating.

2. An apparatus for detecting a mutual positional relationship of two sample members, comprising:
    first and second diffraction gratings, one attached to each of said two sample members, respectively, said first and second gratings being parallel to and facing each other, said first and second diffraction gratings having the same pitch;
    means for driving at least one of said first and second gratings in a direction parallel to said gratings;
    a light source for radiating a coherent light vertically toward the first and second diffraction gratings;
    modulating means for modulating the phase of beams diffracted on the second diffraction grating with respect to that of beams diffracted on the first diffraction grating independent of said driving means;
    detecting means for receiving a first interference beam resulting from those +n-order diffracted beams included in said diffracted beams and a second interference beam resulting from those −n-order diffracted beams included in said
    means for generating a difference signal related to the difference between the intensities of the first and second interference beams; and
    means for generating an average signal related to the average value of said difference signal, said average signal being related to the mutual positional displacement between the first and second diffraction grating, said driving means being responsive to said average signal.

3. An apparatus according to claim 1 or 2, in which said modulating means has a drive mechanism for periodically varying a relative distance between the first and second diffraction gratings.

4. An apparatus according to claim 3, in which said drive mechanism has a piezoelectric oscillating element supporting one of two sample members to cause said sample member to be oscillated.

5. An apparatus according to claim 4, further including a table movable in a direction of the pitch of the diffraction grating, said piezoelectric oscillating element being mounted on said movable table such that it can be moved, together with said one sample member, in the same direction.

6. An apparatus according to claim 1, in which said detecting means includes a pair of photoelectric converters for receiving said first and second interference beams to produce an electrical signal corresponding to the intensity of the light received, a calculating circuit for calculating a difference between the outputs of said photoelectric converters, and an indicator for indicating a difference signal from said calculating circuit.

7. An apparatus according to claim 6, further including drive means for moving one of two sample members in a direction of the pitch of the diffraction grating when said difference signal to said indicator is other than a zero.

8. An apparatus according to claim 1 or 2, further including means for receiving an interference beam resulting from a lower order of diffracted beams than those +n-order diffracted beams and an interference beam resulting from a lower order of diffracted beams than those −n-order diffracted beams to detect a mutual positional displacement between said first and second diffraction gratings from a difference between said first and second interference beams.

9. An apparatus according to claim 1 or 2, wherein said modulating means includes means for modulating the wavelength of a coherent light incident onto the diffraction gratings.

10. An apparatus according to claim 1 or 2, further including a third diffraction grating located with respect to one of said sample members; a fourth diffraction grating arranged opposite to, and parallel to, said third diffraction grating, said fourth diffraction grating having the same pitch as that of said third diffraction grating; a power source for radiating a coherent light vertically toward the third and fourth diffraction gratings; another modulating means for modulating the phase of those beams diffracted onto said fourth diffraction grating, with respect to that of those beams diffracted onto the third diffraction grating; and another detecting means for receiving a third interference beam resulting from those +n-order diffracted beams included into beams diffracted onto the third and fourth diffraction gratings and a fourth interference beam resulting from those −n-order diffracted beams included into beams diffracted on third and fourth diffraction gratings to detect a mutual positional displacement between the third and fourth diffraction gratings from a difference between said third and fourth diffraction gratings.

11. An apparatus according to claim 2, wherein said drive means moves one of said two sample members in a direction of the pitch of the diffraction grating when said average signal is other than a zero.

12. An apparatus for detecting a mutual positional relationship of two sample members, comprising:
   first and second diffraction gratings, one attached to each of said two sample members, respectively, said first and second gratings being parallel to and facing each other, said first and second diffraction gratings having the same pitch and being separated by an average distance d;
   a light source for radiating a coherent light vertically toward the first and second diffraction gratings, said light having a frequency $\lambda$;
   modulating means for modulating one of d and $\lambda$;
   detecting means for receiving a first interference beam resulting from those +n-order diffracted beams included in said diffracted beams and a second interference beam resulting from those −n-order diffracted beams included in said diffracted beams and generating a signal related to the difference between the intensities of the first and second interference beams thereby detecting a mutual positional displacement between the first and second diffraction grating; and
   drive means for moving one of two sample members in a direction of the pitch of the diffraction grating when said difference signal to said indicator is other than a zero.

13. An apparatus for detecting a mutual positional relationship of two sample members, comprising:
   first and second diffraction gratings, one attached to each of said two sample members respectively, said first and second gratings being parallel to and facing each other, said first and second diffraction gratings having the same pitch;
   a third diffraction grating located with respect to one of said sample members;
   a fourth diffraction grating arranged opposite to, and parallel to, said third diffraction grating, said fourth diffraction grating having the same pitch as that of said third diffraction grating;
   a first light source for radiating a coherent light vertically toward the first and second diffraction gratings;
   a second light source for radiating a coherent light vertically toward the third and fourth diffraction gratings;
   first modulating means for modulating the phase of beams diffracted on the second diffraction grating with respect to that of beams diffracted on the first diffraction grating;
   second modulating means for modulating the phase of those beams diffracted onto said fourth diffraction grating, with respect to that of those beams diffracted onto the third diffraction grating;
   first detecting means for receiving a first interference beam resulting from those +n-order diffracted beams included in said diffracted beams and a second interference beam resulting from those −n-order diffracted beams included in said diffracted beams and calculating the difference between the intensities of the first and second interference beams thereby detecting a mutual positional displacement between the first and second diffraction grating; and
   second detecting means for receiving a third interference beam resulting from those +n-order diffracted beams included into beams diffracted onto the third and fourth diffraction gratings and a fourth interference beam resulting from those −n-order diffracted beams included into beams diffracted on third and fourth diffraction gratings to detect a mutual positional displacement between the third and fourth diffraction gratings from a difference between said third and fourth diffraction gratings.

* * * * *